(12) United States Patent
Bush

(10) Patent No.: US 7,991,717 B1
(45) Date of Patent: Aug. 2, 2011

(54) OPTIMAL CESSATION OF TRAINING AND ASSESSMENT OF ACCURACY IN A GIVEN CLASS OF NEURAL NETWORKS

(76) Inventor: Ronald R. Bush, Austin, TX (US)

(*) Notice: Subject to any disclaimer, the term of this patent is extended or adjusted under 35 U.S.C. 154(b) by 2324 days.

(21) Appl. No.: 09/950,190

(22) Filed: Sep. 10, 2001

(51) Int. Cl.
  *G06F 15/18* (2006.01)
  *G06E 1/00* (2006.01)
  *G06E 3/00* (2006.01)
  *G06G 7/00* (2006.01)
(52) U.S. Cl. .......................................................... 706/21
(58) Field of Classification Search ................... 706/21, 706/39, 16, 25
  See application file for complete search history.

(56) References Cited

U.S. PATENT DOCUMENTS

| | | |
|---|---|---|
| 3,788,398 A | 1/1974 | Shephard |
| 3,921,126 A | 11/1975 | Waters |
| 4,183,405 A | 1/1980 | Magnie |
| 4,279,307 A | 7/1981 | Jones |
| 4,327,805 A | 5/1982 | Poston |
| 5,018,112 A | 5/1991 | Pinkerton et al. |
| 5,103,488 A | 4/1992 | Gemello et al. |
| 5,111,516 A | 5/1992 | Nakano et al. |
| 5,214,744 A | 5/1993 | Schweizer et al. |
| 5,251,286 A | 10/1993 | Wiener et al. |
| 5,265,192 A | 11/1993 | McCormack |
| 5,313,558 A | 5/1994 | Adams |
| 5,351,309 A | 9/1994 | Lee et al. |
| 5,355,313 A | 10/1994 | Moll et al. |
| 5,434,927 A | 7/1995 | Brady et al. |
| 5,444,619 A | 8/1995 | Hoskins et al. |
| 5,459,587 A | 10/1995 | Fukushima |
| 5,496,093 A | 3/1996 | Barlow |
| 5,613,039 A | 3/1997 | Wang et al. |
| 5,648,938 A | 7/1997 | Jakubowicz |
| 5,732,697 A | 3/1998 | Zhang et al. |
| 5,740,274 A | 4/1998 | Ono et al. |
| 5,742,740 A | 4/1998 | McCormack et al. |
| 5,754,709 A | 5/1998 | Moriya et al. |
| 5,761,326 A | 6/1998 | Brady et al. |
| 5,775,806 A | 7/1998 | Allred |
| 5,776,063 A | 7/1998 | Dittrich et al. |
| 5,777,481 A | 7/1998 | Vivekanandan |
| 5,812,068 A | 9/1998 | Wisler et al. |
| 5,828,981 A | 10/1998 | Callender et al. |

(Continued)

FOREIGN PATENT DOCUMENTS

EP 0731363 9/1996

(Continued)

OTHER PUBLICATIONS

J.T. Lo, "Statistical Method of Pruning Neural Networks" IJCNN, Jul. 1999.*

(Continued)

*Primary Examiner* — Michael Holmes
(74) *Attorney, Agent, or Firm* — Johnson & Associates (57) ABSTRACT

A system, method, and process for configuring iterative, self-correcting algorithms, such as neural networks, so that the weights or characteristics to which the algorithm converge to do not require the use of test or validation sets, and the maximum error in failing to achieve optimal cessation of training can be calculated. In addition, a method for internally validating the correctness, i.e. determining the degree of accuracy of the predictions derived from the system, method, and process of the present invention is disclosed.

12 Claims, 4 Drawing Sheets

Basic Overall Schematic Diagram of Present Invention

U.S. PATENT DOCUMENTS

| | | | |
|---|---|---|---|
| 5,862,513 A | 1/1999 | Mezzatesta et al. | |
| 5,884,295 A | 3/1999 | Moll et al. | |
| 5,924,048 A | 7/1999 | McCormack et al. | |
| 5,940,777 A | 8/1999 | Keskes | |
| 6,002,985 A | 12/1999 | Stephenson | |
| 6,035,057 A * | 3/2000 | Hoffman | 382/159 |
| 6,119,112 A | 9/2000 | Bush | |
| 6,218,841 B1 | 4/2001 | Wu | |
| 6,236,942 B1 * | 5/2001 | Bush | 702/14 |
| 6,411,903 B2 * | 6/2002 | Bush | 702/14 |
| 6,574,565 B1 * | 6/2003 | Bush | 702/14 |
| 6,754,589 B2 * | 6/2004 | Bush | 702/13 |
| 7,581,592 B1 * | 9/2009 | Bush et al. | 166/302 |

FOREIGN PATENT DOCUMENTS

| | | |
|---|---|---|
| EP | 0840141 | 5/1998 |
| GB | 2303475 | 2/1997 |
| RU | 2094828 | 10/1997 |
| WO | WO 9319426 | 9/1993 |
| WO | WO0016126 | 3/2000 |

OTHER PUBLICATIONS

A new descriptive clustering algorithm based on Nonnegative Matrix Factorization, Zhao Li; Hong Peng; Xindong Wu; Granular Computing, 2008. GrC 2008. IEEE International Conference on Digital Object Identifier: 10.1109/GRC.2008.4664752 Publication Year: 2008, pp. 407- 412.*

Inference of a probabilistic finite state machine from its output, Rouvellou, I.; Hart, G.W.; Systems, Man and Cybernetics, IEEE Transactions on vol. 25 , Issue: 3 Digital Object Identifier: 10.1109/21.364856 Publication Year: 1995, pp. 424-437.*

Extracting Actionable Knowledge from Decision Trees, Qiang Yang; Jie Yin; Ling, C.; Rong Pan; Knowledge and Data Engineering, IEEE Transactions on vol. 19 , Issue: 1 Digital Object Identifier: 10.1109/TKDE.2007.250584 Publication Year: 2007, pp. 43-56.*

Flagship Geo, "Home Page", Publication Date Unknown, http://www.flagshipgeo.com.

Xing-Yao, Yin et al, "Predicting Oil and Gas Reservoir and Calculating Thickness of Reservoir From Seismic Data Using Neural Network", Oct. 14-18, 1996, pp. 1601-1604, Signal Processing—$3^{rd}$ International Conference on Signal Processing.

Essenreiter, R. et al, "Multiple Reflection Attenuation in Seismic Data Using Backpropagation", Jul. 1998, pp. 2001-2011, IEEE Transactions on Signal Processing, vol. 46, No. 7.

Nikravesh et al., "Dividing oil fields into regions with similar behavior using neural network and fuzzy logic approaches", IEEE Fuzzy Information Processing Society, 1996—FAFI Bennial Confernce of the North American, Jun. 19, 1996.

* cited by examiner

FIG. 1 Basic Overall Schematic Diagram of Present Invention

FIG. 2 MASOF with Inflection Point and Asymptote

FIG. 4 MASOF without Inflection Point

OPTIMAL CESSATION OF TRAINING AND ASSESSMENT OF ACCURACY IN A GIVEN CLASS OF NEURAL NETWORKS

CROSS REFERENCE TO RELATED APPLICATIONS

This application is related to U.S. Pat. No. 6,119,112 "Optimum Cessation of Training in Neural Networks" and to U.S. Pat. No. 6,236,942 "System and Method for Delineating Spatially Dependent Objects, such as Hydrocarbon Accumulations from Seismic Data," both of which are incorporated herein by reference.

BACKGROUND OF THE INVENTION

1. Field of the Invention

The present invention relates to optimally configuring and then ceasing training in neural networks of a class that can be described as monotonic, asymptotic, and single-objective functions (MASOF) with or without an inflection point. This type of function is best described by example, and an example using the prediction of hydrocarbon producing areas and hydrocarbon non-producing areas directly from seismic data (U.S. Pat. No. 6,236,942) is used to illustrate the system and method of the present invention.

However, the method disclosed is also applicable to a wide range of applications other than those specifically taught herein. Many other applications will be apparent to those skilled in the pertinent art. Accordingly, it is intended by the appended claims to cover all such applications as fall within the true spirit and scope of the present invention.

2. Description of the Prior Art

The present invention relates to a system and method for ceasing the training of certain neural networks at the optimal training point that is most consistent with the objective of the neural network developer. In particular, one inventive concept of the present invention is the removal of the necessity in traditional practice to divide at least a portion of the data into training, test, and validation data sets. This traditional and commonly known practice of dividing some of the data into training, test, and validation data sets is described in a large number of patents including U.S. Pat. No. 6,236,942, "System and Method for Delineating Spatially Dependent Objects, such as Hydrocarbon Accumulations from Seismic Data", that is included herein by reference. There has been a long felt need to be able to dispense with this burdensome and time-consuming practice and, this is accomplished in the case of the present invention.

One of the characteristics of neural networks is the frequent requirement to have to train the networks for long periods of time. Prior to the issuance of U.S. Pat. No. 6,119,112, "Optimum Cessation of Training in Neural Networks", neural networks were commonly trained to the point where the average sum-squared error on the training set was reduced to a given level, or a predetermined number of iterations was exceeded. Thus, there was a long existing need in the art to dynamically determine the point at which further training no longer made any improvement in the predictive or classification ability of the neural network. The techniques taught in U.S. Pat. No. 6,119,112 accomplished this and these techniques are extended and enhanced by the present invention for a particular class of neural networks that can be configured to ease the task of determining the optimal cessation of training point as well as improve the accuracy of neural networks across a wide range of applications. How to carry out the configuration of neural networks to take advantage of other inventive techniques disclosed in the present invention is one inventive concept addressed by the present invention. U.S. Pat. No. 6,119,112 is an example of the state of the art prior to the present invention.

FEATURES OF THE INVENTION

The above-mentioned, long existing needs have been met in accordance with the present invention disclosing a system, method, and process for providing a way to configure neural networks and carry out the optimal cessation of training more easily and accurately across a wide range of applications without resorting to the use of test and validation data sets.

It is therefore one feature of the present invention to disclose how to configure neural networks for easy and accurate cessation of training across a wide range of applications.

It is yet another feature of the present invention to disclose how the optimum point of cessation is determined for properly configured neural networks.

It is yet another feature of the present invention to disclose how the system, method, and process can be used to easily automate the neural network process.

It is yet another feature of the present invention to disclose how to determine the accuracy of the neural network's results.

In accordance with these and other features, the system, method, and process of the present invention are based on properly taking advantage of the characteristics inherent in neural networks and the class of applications to which the present invention refers.

The above as well as additional objects, features, and advantages of the present invention will become apparent in the following detailed written description.

SUMMARY OF THE INVENTION

The invention provides a method for configuring an iterative, self-correcting algorithm having an objective function, the method comprising the steps of: selecting training data; iterating the algorithm on the selected training data; and relying on characteristics of the objective function to determine when the solution to the algorithm has been reached.

BRIEF DESCRIPTION OF THE DRAWINGS

The novel features believed characteristic of the invention are set forth in the appended claims. The invention itself however, as well as a preferred mode of use, further objects, aspects and advantages thereof, will be best understood from the following detailed description of an illustrative embodiment when read in conjunction with the accompanying drawings, wherein:

DETAILED DESCRIPTION OF THE PREFERRED EMBODIMENTS

Definitions

"Weights" vector or function that holds the characteristics obtained from iterating on the training data.

"Single-Objective Function" a neural network result that is predicated on distinguishing between one characteristic or aspect in the training data, such as between non-producing (dry) areas and producing areas in the case of seismic data used to delineate hydrocarbon accumulations.

"Interpreted" as related to seismic data, for purposes of this invention, means delineating producing areas from dry areas in an oil and/or gas field.

Overview

The invention described below relates in general to a method and system for the optimum cessation of training in neural networks without the need for test or validation data sets and to a method and system for determining the accuracy of the neural network as related to the objective established by the neural network developer. The need for test and validation data sets is also not a requirement in the method and system for the determination of accuracy of the neural network training taught in the present invention.

Neural networks iterate through a training data set taking on increasing characteristics of the training data with each additional iteration. If, for example, one subset of seismic data in a training set is related to producing areas and another subset of the seismic training data is related to dry areas in an oil and or gas field, then with each increasing iteration the neural network changes the weights vector, or characteristics derived from the seismic data, to where at some point in the iterative process, the weights vector is best able to distinguish between the producing and dry characteristics inherent in the seismic data. The important point to observe in this situation is that the training data is in no way related to any type of test or validation data that is commonly used in traditional neural network methods. The optimum point of cessation of training is strictly inherent in the training data itself. Thus, the present invention teaches how the optimum point for cessation of training can be determined without resort to test or validation data sets.

Figure 1:
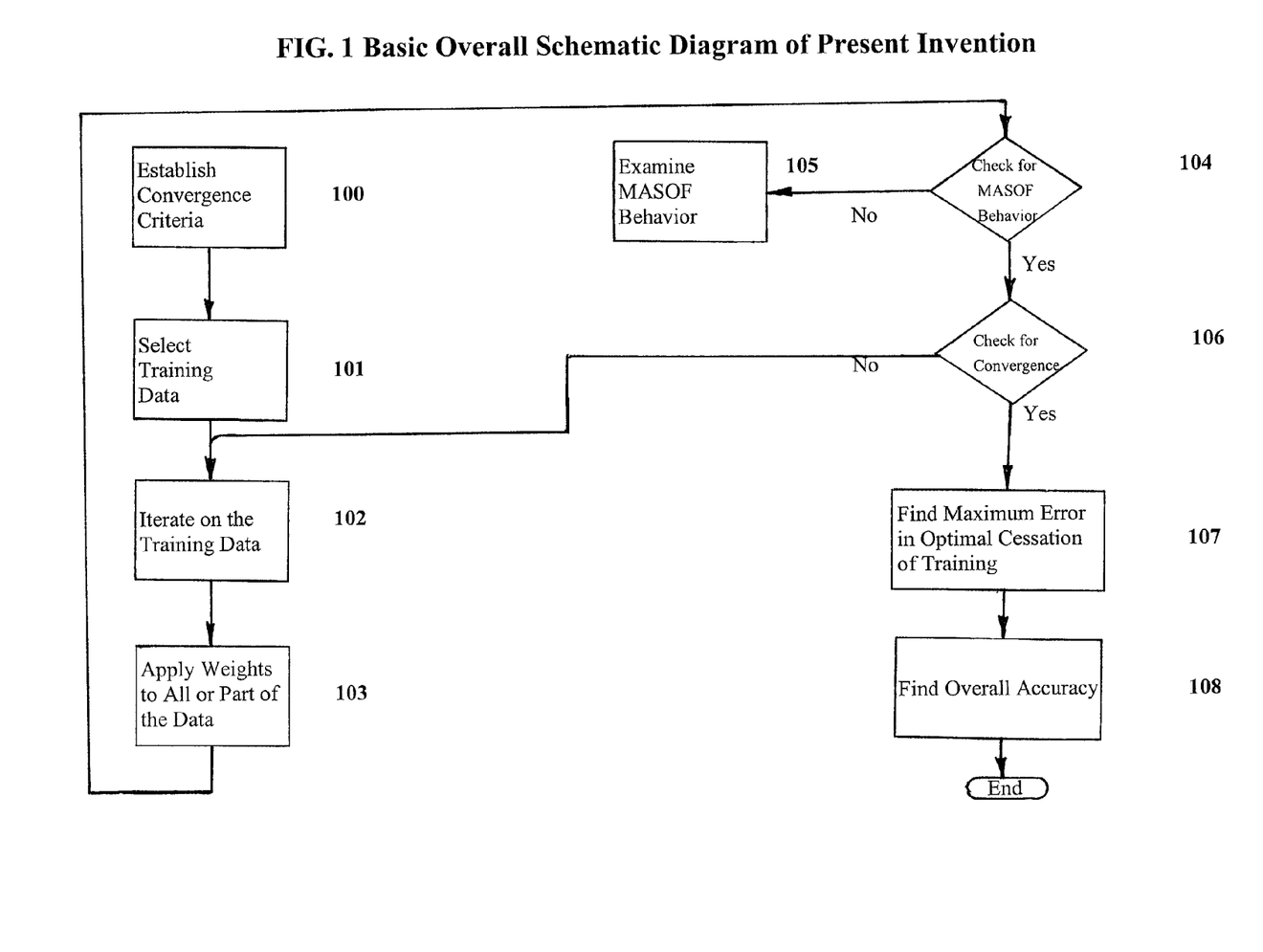
FIG. 1 is a basic overall flow diagram of the method, system, or process underlying the present invention.

To understand how this is achieved, assume as shown in FIG. 1, that the first step in the process is the establishment of a convergence criteria 100. In the case of the example of delineating producing and dry areas in a hydrocarbon field, the convergence criteria might be established as the single objective of recognizing when the characteristics distinguishing producing from non-producing (i.e. dry) areas are first recognized. This might be a conservative approach in the event the drilling of a hydrocarbon well is being contemplated. However, other convergence criteria might be established based on multiple objectives such as also distinguishing between gas and oil, predicting production levels, etc.

Figure 2:
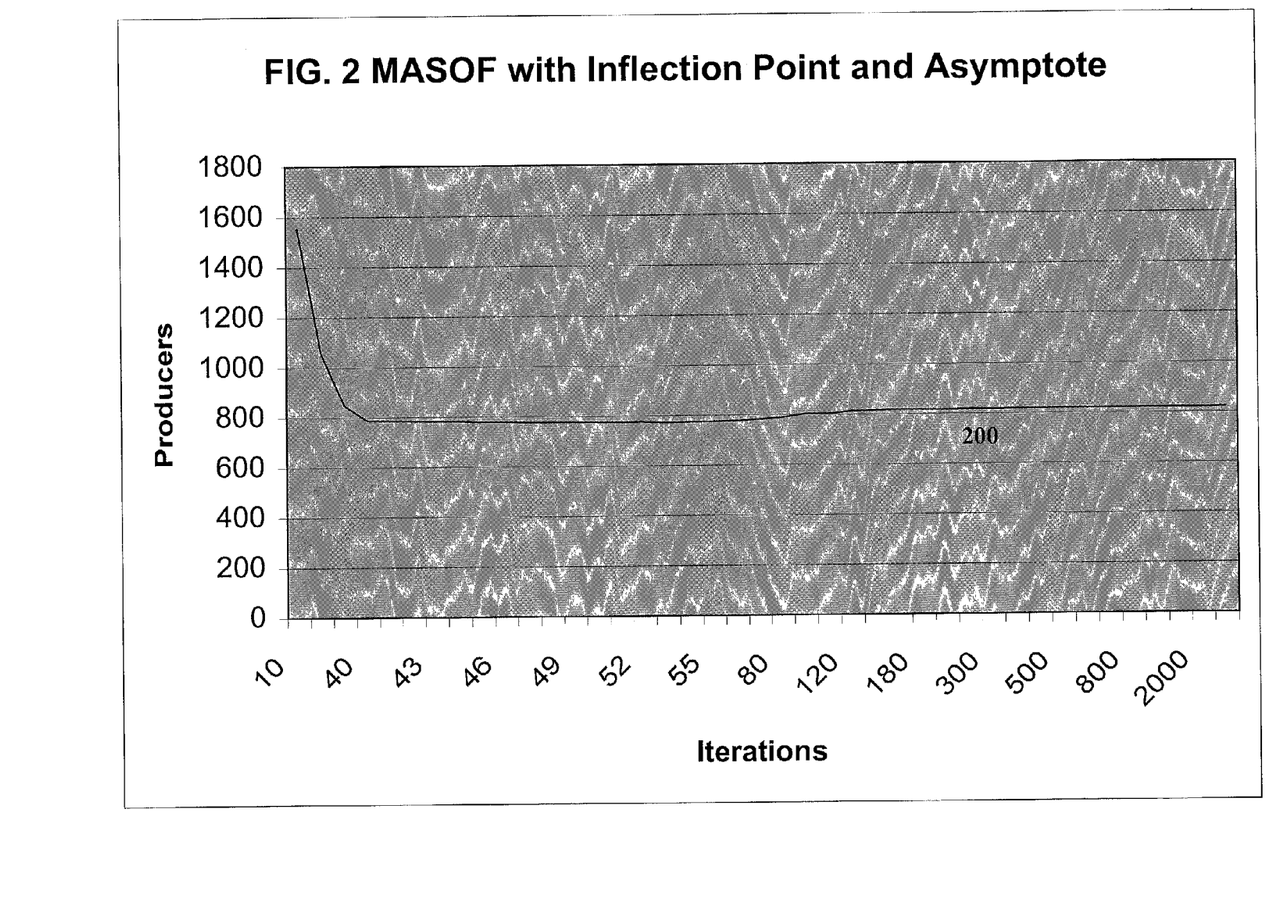
FIG. 2 shows a plot of a "Monotonic, Asymptotic, and Single-Objective Function (MASOF) with an Inflection Point and Asymptote" that exhibits all of the key elements in the preferred embodiment of the present invention.
Figure 3:
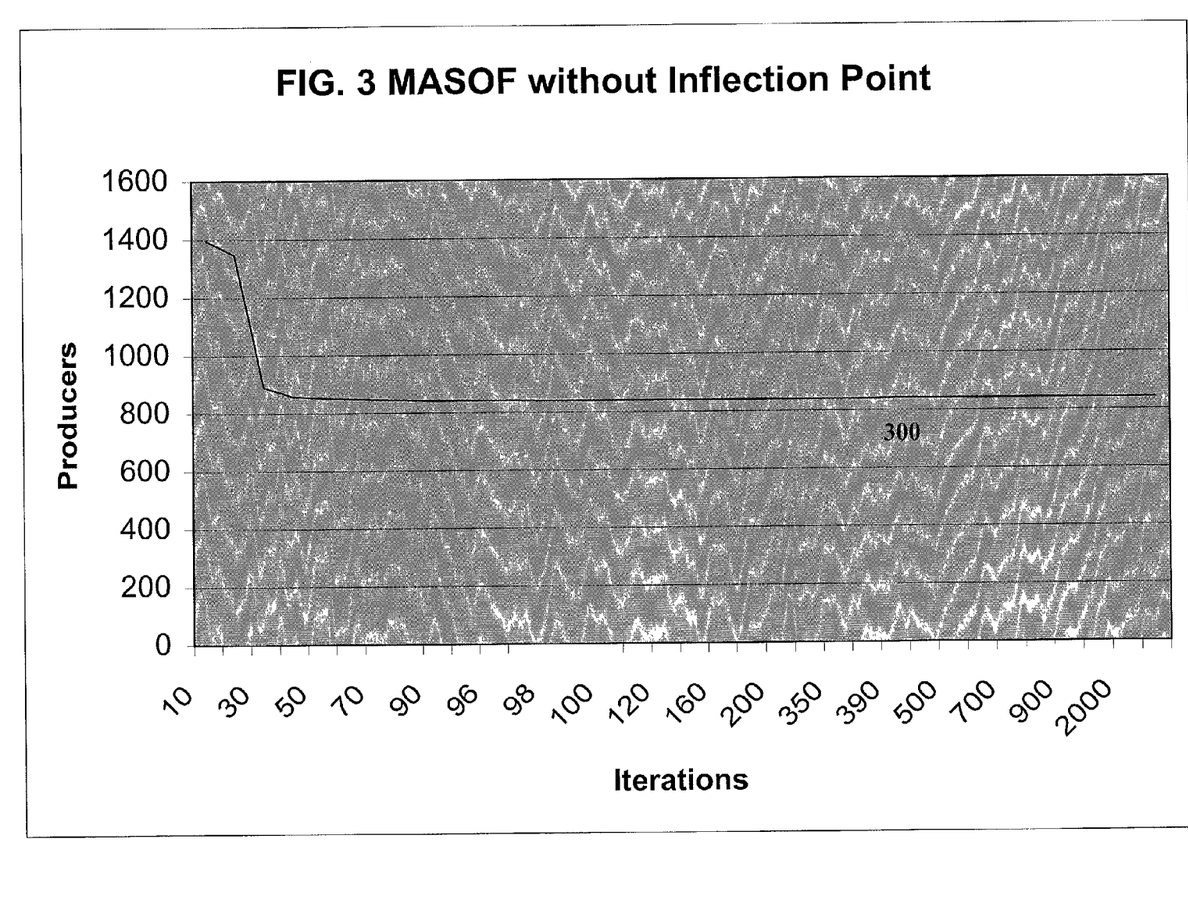
FIG. 3 shows a plot of a "Monotonic, Asymptotic, and Single-Objective Function" (MASOF) without an Inflection Point.

The next step in the process, as shown in FIG. 1, is 101 the selection of a training data set that should produce a monotonic, asymptotic, single-objective function (MASOF). A MASOF with an inflection point is shown in FIG. 2 by curve 200 and a MASOF without an inflection point is shown in FIG. 3 by curve 300. Both of these MASOF functions are real functions. The functions illustrated in FIG. 2 and FIG. 3 have been derived from actual public domain data taken from a seismic survey in the Stratton Aqua Dulce field in Nueces and Kleberg counties in South Central Texas. The use of the words 'should produce' are operative and important, since it is possible that multiple characteristics or objectives might be contained in the training data that has been selected. When the selected training data exhibits certain types of behavior it is known that the selected training data does not produce a MASOF, and this conveys important information to the neural network developer.

The next step in the process, as shown in FIG. 1, is 102, carry out one or more iterations of the neural network, and save the adjusted weights to apply to the data in the next step of the process.

The next step in the process, as shown in FIG. 1, is 103, the application of the weights, or characteristics of the training data, to theoretically all of the seismic data or more likely just a part of the seismic data, after each iteration to yield an objective function. The word 'theoretically' related to all of the seismic data is used to indicate that this is possible but might best not actually be performed until the optimum cessation of training point has been determined in order to save time. It should be noted that 'part of the seismic data' does not carry any implication that the part of the seismic data selected has to constitute a test set, i.e. data with known characteristics which in our example would have to be from known producing and known dry areas. Nothing has to be known about the data to which the weights are applied.

The next step in the process, as shown in FIG. 1, is 104, a check to determine that the objective function is exhibiting certain characteristics, such as MASOF type behavior. If the objective function is not monotonic, asymptotic, and single-objective then the neural network developer is alerted and may take various steps (see step 105 in FIG. 1) based on this non-MASOF behavior. Non-MASOF behavior and the steps taken in the event it is present are discussed in the DETAILED DESCRIPTION below. If the objective function exhibits certain characteristics (e.g., MASOF type behavior), the solution to the algorithms has been reached.

The next step in the process, as shown in FIG. 1, is 106, check for convergence after each iteration and continue training until the convergence criteria is met.

The next step in the process, as shown in FIG. 1, is 107, determine the maximum error in cessation of training which is based on the convergence criteria that was initially selected.

The final step in the process, as shown in FIG. 1, is 108, determine the accuracy of the neural network when applied to all or part of the data.

Now that the broad overview has been completed, it is necessary in order to appreciate the various aspects and benefits produced by the present invention to have the detailed understanding that can be best provided by considering a detailed real world example.

DETAILED DESCRIPTION

Following is a more detailed description of one embodiment of the invention. The following example, which is used to better describe the invention, has been taken directly from the real world solution of a public domain seismic survey in the Stratton Aqua Dulce field in Nueces and Kleberg counties in South Central Texas.

We again refer to FIG. 1 and the first step in the process, the establishment of the convergence criteria, 100. For purposes of this example we will concentrate on only one gas producing level that contains only minor traces, if any, of oil. We wished to delineate producing and dry areas in this hydrocarbon field, and the convergence criteria was established as the simple objective of recognizing when the characteristics distinguishing producing from dry areas were first recognized. This conservative approach was adopted in the hypothetical event the drilling of a hydrocarbon well was undertaken. We wanted to err in the direction of being sure that all areas predicted as producing were indeed commercial producers, instead of areas that simply contain traces of hydrocarbons that do not qualify as commercial producers. Later in the process we will teach a method to calculate the maximum error that can occur from failing to optimally cease training consistent with some other criteria, such as finding all areas containing even traces of hydrocarbons.

Next, we again refer to FIG. 1 and step 101 the selection of a training data set that should produce a monotonic, asymptotic, single-objective function (MASOF). From a 3D seismic survey that is in the public domain, since it was shot under a grant from the Department of Energy to the Bureau of Economic Geology at the University of Texas, we selected two traces. One of these two traces was taken from a known producing area and the other was taken from a known non-producing, or dry, area. The value of one (1) was assigned as the target value to the trace from the producing area and the value of zero (0) was assigned as the target value to the trace from the non-producing area. These two traces comprised our training set. The criteria used in the selection process in order to obtain MASOF behavior are 1) there needs to be an equal number of producing and dry traces, in the case of our example one each, and 2) there needs to be only a single objective implicit in the data, i.e. distinguishing gas producing areas from non-producing areas, in the case of our example. In general this can be stated as 1) selecting an approximately equal number of data values from two distinctly different types of data and assigning a distinctly different value to each of the two selected types of data, and 2) selecting the two types of data such that there is only a single objective implicit in the data. Trying to distinguish and predict oil as opposed to gas or other such considerations was not implicit in the training data, i.e. the data does not contain any way to distinguish the characteristics of oil. These two traces were selected from a total of 7,121 applicable traces out of a total of 393,081 traces in the survey. The objective was to use the characteristics in these two traces to predict through the use of neural network technology the remainder of the 7,121 traces.

Next, we again refer to FIG. 1 and step 102, iteration through a neural network to distinguish the characteristics that are required to predict producing from non-producing areas. One amplitude at a time was processed, i.e. one interval of 2 msec, and the behavior of the result was found to be approximately the same for all other intervals processed as long as the two data selection criteria enumerated above were adhered to. The neural network architecture chosen was varied and the results remained the same. The process is not sensitive to the neural network architecture that is chosen. The weights resulting from each successive iteration of the neural network were then stored for later use in the next step.

The next step in the process, as shown in FIG. 1, is 103, the application of the weights, or characteristics obtained from the training data, to theoretically all of the seismic data, which in our example was the 7,121 applicable traces. Then, at each iteration, all traces with a target value predicted to be greater than 0.5 were considered to be in producing areas and all traces with a target value predicted to be less than or equal to 0.5 were considered to be in non-producing areas. At the start of the iterative neural network process, i.e. the first few iterations, all to most traces were predicted to be in producing areas, i.e. greater than 0.5; and as the iterative process progressed more and more traces became less than or equal to 0.5 indicating that they were from non-producing areas. Refer to FIG. 3 curve 300 for an example of the output from the Stratton Field. In this case the number of traces predicted to be from producing areas started with the 10th iteration as 1396 and dropped to 840 out of a possible 1780 traces, to which the weights were applied, at the 98th iteration. From the 99th iteration through the 389th iteration the number of predicted producers remained at 840. On the 390th iteration the number of producing traces increased to 841, and remained at 841 until the 100,000th iteration. This is a clear case of asymptotic behavior, and for the application we are working with it has profound implications. From over 100 years of drilling millions of oil and gas wells, as well as from our progress in the earth sciences, it is clear that some areas produce hydrocarbons and some do not, our predicted results are consistent with this understanding, as well as matching the extensive well control in the Stratton Field.

Figure 4:
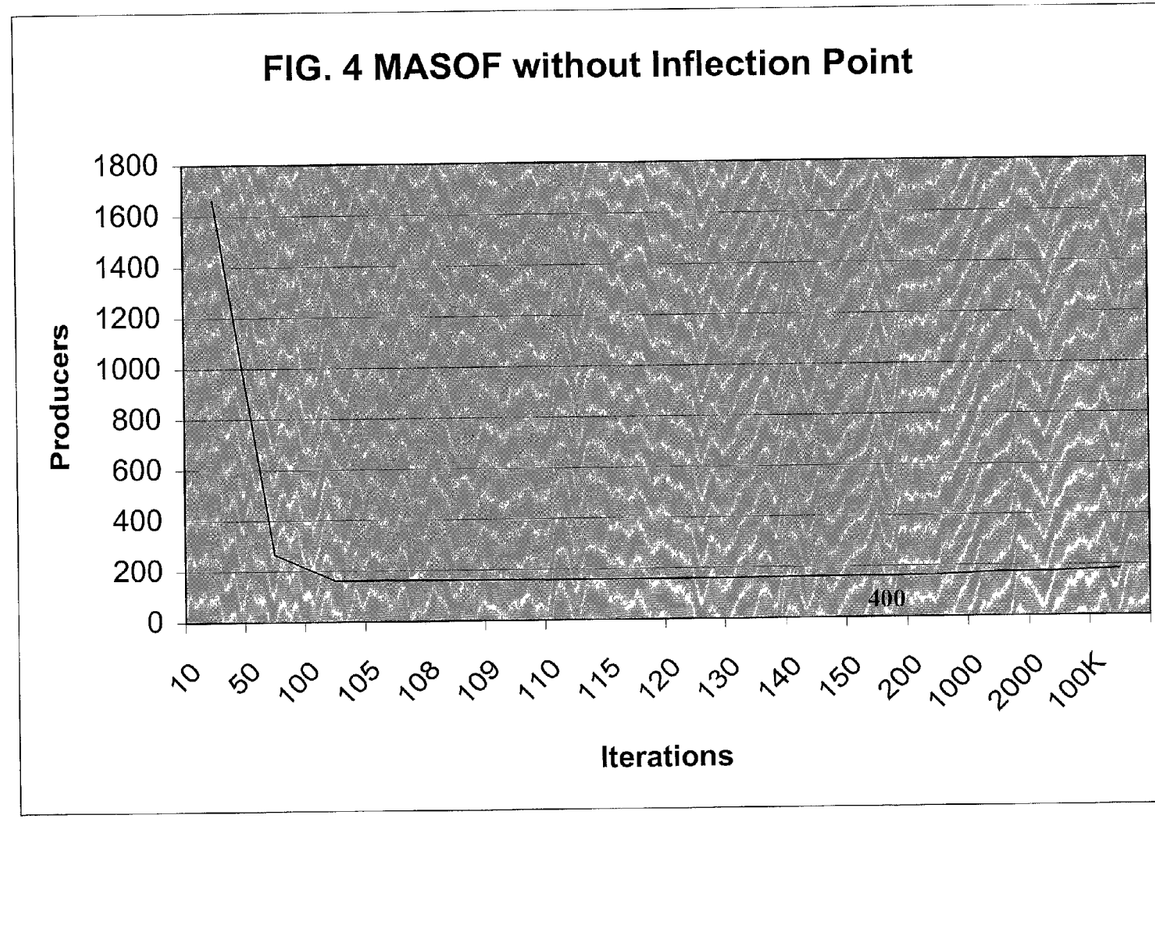
FIG. 4 shows yet another plot of a "Monotonic, Asymptotic, and Single-Objective Function" (MASOF) without an Inflection Point.

Furthermore, when applying the same technique, using the same two traces for the training data, to an area approximately 44 feet below the area shown in FIG. 3 curve 300, the MASOF shown in FIG. 4 curve 400 was obtained. Using FIG. 1, step 105, we check for MASOF behavior. In the case shown in FIG. 4 curve 400, at the 10th iteration 1663 traces are predicted as producers, and at the 110th iteration only 159 traces are predicted as producers. From the 110th iteration on the behavior is monotonic and asymptotic. However, in this case the asymptotic behavior, although present, is not as pronounced as it is for the case shown in FIG. 3 curve 300. By the 100,000th iteration the number of predicted producers has risen to 183. Techniques for assessing this type of deviation in MASOF behavior are disclosed below in step 107. However, the results are still consistent with the Stratton Field well control. Moreover, consistent with our conservative convergence criteria, only the 159 wells initially identified would be considered as prospects for drilling. It is thought that in this case areas containing small amounts of hydrocarbons are being recognized as the number of iterations increases.

Still referring to FIG. 1, and in this case step 105, we examine another case of MASOF behavior, which is shown in FIG. 2 curve 200. Here, the MASOF curve exhibits both an inflection point as well as an asymptote. The curve 200 in FIG. 2 curve 200 was produced using the same two traces as well as six additional traces for the training data, divided equally between producing and non producing traces; but in this case four 2 msec sampling intervals were predicted. Furthermore, it is known from the well control in the Stratton survey that production has taken place in more than one of the strata in the 8 msec interval predicted in FIG. 2 curve 200. In other words, the training data contains more than one objective related to the number of producing traces in the interval examined, even though the interval is not very thick. Moreover, this is readily apparent in the function plotted in FIG. 2 curve 200, although for the purposes of the example, the function is considered to have a single objective. In FIG. 2 curve 200, the function has an inflection point at iteration 53 where the neural network first begins to recognize the characteristics in the data that indicate a trace contains indications of the presence of hydrocarbons. At iteration 53 the neural network recognizes 773 producing traces. The function later goes asymptotic with 819 producing traces and eventually finds 823 producing traces at 100,000 iterations, which is not shown in FIG. 2 curve 200. Even though the data implicitly contains multiple objectives, valuable information is obtained by configuring the neural network to produce monotonic, asymptotic, single objective behavior.

The next step in the conceptual process shown in FIG. 1 is 106, check for convergence. Here it is important to point out that the process shown in FIG. 1 and described herein as the present invention is strictly a conceptual description of an order in which all or some of the various steps may be carried out. Not all of the steps are necessary, they are merely sufficient; and the order of the steps is not critical. This can be advantageous in terms of the solution of problems using the present invention. As a practical matter, the neural network weights may be saved for an appropriate number of iterations in the past. These weights being indexed by the iteration number at which they were achieved. When it has been determined that an inflection point or an asymptote has been reached the iteration number with the appropriate value of the objective function can be used to retrieve the optimum neural network weights. Some of the steps might be carried out in real-time, such as when seismic data is being acquired. Therefore, since the method disclosed is applicable to a wide range of applications other than those specifically taught herein, many of which will be apparent to those skilled in the pertinent art, it is intended by the appended claims to cover all such applications as fall within the true spirit and scope of the present invention. Thus, for the modeling purposes of the example, the example will be assumed to be carried-out on an iteration-by-iteration basis. And in FIG. 1 step 106 when the process has converged we can move to step 107.

As shown in FIG. 1 step 107, because of the MASOF behavior exhibited by properly configured neural networks, it is possible to find the maximum error in optimal cessation of training. It should be noted that this is not the overall accuracy of the neural network related to the problem being solved, which is covered in step 108; but only the maximum error in failing to optimally cease training. From the MASOF behavior exhibited by the objective function, either by going asymptotic or by the presence of an inflection point, it is possible to tell when the neural network first begins to recognize the patterns and characteristics in the training data. Likewise, the maximum recognition of the patterns in the data is given by the asymptote. In the example presented in FIG. 3 curve 300, the function starts asymptotic at 98 iterations when 840 traces show the presence of hydrocarbons. This behavior persists, and at 100,000 iterations the function has only moved up to 841 traces that indicate the presence of hydrocarbons. Thus, the maximum percentage error in failing to optimally cease training of the neural network is given by $$e=(nf-ns)/ns*100 \qquad (1)$$

where: e=maximum error in failing to optimally terminate training, ns=number of producing traces at the start of pattern recognition, and nf=number of producing traces at the finish or end of pattern recognition. In the case of the function in FIG. 3 curve 300, equation 1 gives (841−840)/840 or a negligible 0.12 percent. Similarly, for the function in FIG. 4 curve 400, equation 1 gives (183−159)/159 or 15.1 percent. While for the function in FIG. 2 curve 200, equation 1 gives (823−773)/773 or only 6.45 percent, even though we know the function in FIG. 2 curve 200 is subject to multiple objectives in the training data.

In addition, to providing data from which to determine the maximum error in failing to optimally cease training, the properly configured neural network's MASOF behavior provides the neural network developer with information on possible problems, if the performance of the function is not as expected. Furthermore, the neural network developer can choose the convergence criteria best suited to achieve his objectives.

Again referring to FIG. 1 and this time to step 108, find overall accuracy, we address the wider question of the neural network's overall results. It has been a long-standing problem in the use of neural networks to be able to determine the degree of accuracy a given prediction or classification has achieved. Therefore, it is yet another objective of the present invention to disclose a method for internally validating the correctness, i.e. determining the degree of accuracy of the predictions derived from the system, method, and process of the present invention.

This objective can be achieved in by first, applying the weights achieved at the optimal cessation of training to the entire data set, and then randomly selecting from the complete set of predictions a new training set similar to the original training set. The new training set is then trained to the optimum point and the resulting neural network weights are again applied to the complete data set, less the randomly selected training set. The variance from the original result is recorded. A new training set is again randomly selected and trained to the optimum point, and the resulting neural network weights are again applied to the complete data set, less the randomly selected training set. The variance from the original classification is again recorded. This randomly select, train, and apply procedure is repeated numerous times, for example thirty (30) or more times. Standard statistical methods, well known to those skilled in the art, are then used to calculate the mean and confidence interval of the neural network variance for the particular application under consideration.

There are a number of areas where the system, methods, and process disclosed by the present invention can find wide applicability. Therefore, it has been one goal of the present invention to indicate how the general application of the concepts disclosed in the present invention can be applied to a variety of fields. Furthermore, the specific characteristics of many different applications can lead to basically the same neural network configuration problem. Accordingly, it is intended by the appended claims to cover all such applications as fall within the true spirit and scope of the present invention.

Definition of Neural Network

Neural networks are trained by a training process that iteratively presents a training set to the neural network through its input layer. In general the goal of the training process is to minimize the average sum-squared error over all of the training patterns. This goal is accomplished by propagating the error value back after each iteration and performing appropriate weight adjustments. After a sufficient number of iterations, the weights in the neural network begin to take on the characteristics or patterns in the data. Determining when, i.e. the iteration number at which, the neural network has taken on the appropriate set of characteristics was, prior to the method disclosed in U.S. Pat. No. 6,119,112, "Optimum Cessation of Training in Neural Networks," a problem. In real world situations, where noise is embedded along with the patterns in the data, it is commonly recognized that the neural network fits the underlying pattern first and then begins to memorize the data. By memorizing the data the neural network is thus taking on the characteristics of the noise as well as the characteristics of the underlying pattern. This condition is referred to as over fitting or over training the network. This is why training should be stopped at the optimum point.

The overall goal is to train the neural network to the point where the underlying pattern has been detected but the noise has not yet been incorporated into the weights. The present invention teaches a very precise way of accomplishing this goal for a given class of applications, without resorting to the time consuming, and possibly inaccurate, use of test and validation sets. Furthermore, any algorithm incorporating the concepts of iteration, self-correction, i.e. in neural network terminology back propagation, and the adjustment of characteristics or weights can utilize the configuring rules taught herein. For example, the long known Gauss-Slidell iteration for solving an n×n set of simultaneous equations will exhibit the same MASOF behavior when properly configured. Accordingly, it is intended by the appended claims to cover all such applications as fall within the true spirit and scope of the present invention.

Exemplary Embodiments

One embodiment of the present invention has been described in the detailed description. It was described as being able to be used with any neural network implementation for any application where a neural network can be configured to produce MASOF behavior. For example, this approach might be used by a geophysicist who wants to gain a first hand understanding of the geology underlying a particular seismic survey. Other applications will be apparent to those skilled in the pertinent arts.

Yet another embodiment of the present invention is as a part of any algorithm incorporating the concepts of iteration, self-correction, i.e. back propagation in neural network terminology, and the adjustment of characteristics or weights, whenever such algorithm utilizes the configuring rules taught herein with or without the use of test and validation data sets.

Yet another embodiment of the present invention is as a hardware implementation of any algorithm incorporating the concepts of iteration, self-correction, i.e. back propagation in neural network terminology, and the adjustment of characteristics or weights, whenever such algorithm utilizes the configuring rules taught herein with or without the use of test and validation data sets. A hardware implementation for utilizing the algorithm with the configuring rules will be found to be particularly valuable in the acquisition and real-time processing of seismic data.

Although the concepts disclosed by the present invention are designed for efficiency, the overall process is still computationally intensive. Therefore, it is yet another objective of the present invention to indicate that the concepts disclosed in the present invention can be implemented in parallel on different machines and can be embedded directly in hardware to expedite processing. Parallel processing of the concepts embodied in the present invention can be accomplished in different ways. For example, multiple machines can be used in the traversal of the data to locate a major object, such as a hydrocarbon accumulation in seismic data. In this case, separate positions of a sliding window can be trained on separate machines in parallel; thus advancing the sliding window by the number of machines for each parallel solution of the problem. At the end of each parallel solution, the objective function can be combined into a single file for monitoring purposes. Moreover, the parallel solutions can be carried out on either standalone or networked computers as well as on special parallel hardware adapted to carry out an iterative, self-correcting, single-objective function algorithm with the configuring rules. Such hardware will be to be particularly valuable in the acquisition and real-time processing of seismic data.

The present invention includes a method of producing hydrocarbon products from an oil and/or gas field. For example, seismic data is gathered in the oil and or gas field (dynamite, Vibroseis, Thumper, etc.), and processed with the techniques described above. Then hydrocarbons are extracted from the oil and/or gas field.

The present invention includes an apparatus composed of either general-purpose processors or specially adapted processors to carry out the iterative, self-correcting functions specified herein. The apparatus would include suitable storage capability and any necessary software or firmware required to carry out the functions specified herein, either in standalone or parallel modes. This apparatus may be used either off-line or in real-time during the seismic acquisition process.

While the present invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A method for configuring an iterative, self-correcting algorithm having an objective function, the method comprising the steps of:
   selecting training data;
   iterating the algorithm on the selected training data to modify weights in the algorithm; and
   relying on characteristics of the objective function to determine when the solution to the algorithm has been reached.

2. The method of claim 1, wherein the iterative, self-correcting, algorithm is a neural network.

3. The method of claim 1, wherein the iterative, self-correcting, algorithm is used to predict producing and non-producing hydrocarbon areas from seismic data.

4. The method of claim 1, wherein the iterative, self-correcting, algorithm is a used to predict producing and non-producing hydrocarbon areas from seismic data in real-time during the acquisition of the said seismic data.

5. The method of claim 1, wherein the iterative, self-correcting, algorithm is embedded in hardware.

6. The method of claim 1, wherein the iterative, self-correcting, algorithm is run on parallel computers.

7. The method of claim 1, wherein the iterative, self-correcting, algorithm is embedded in hardware that is run in parallel.

8. The method of claim 1, wherein the characteristics relied upon include monotonic and asymptotic characteristics.

9. The method of claim 1, wherein the characteristics relied upon include monotonic behavior with an inflection point.

10. The method of claim 1, wherein the iterative, self-correcting, algorithm is configured without using test or validation data.

11. A method for configuring an iterative, self-correcting algorithm having an objective function, the method comprising the steps of:
    selecting training data;
    using back propagation to train the algorithm by iterating the algorithm on the selected training data to modify weights in the algorithm; and
    relying on characteristics of the objective function to determine when the solution to the algorithm has been reached.

12. The method of claim 11, wherein the iterative, self-correcting, algorithm is a neural network.

* * * * *